Oct. 30, 1962     E. SCHICKEDANZ     3,061,460
NON-THERMOPLASTIC FOAM MATERIAL IMPREGNATED WITH
THERMOPLASTIC RESIN AND METHOD OF MAKING
Filed April 24, 1959
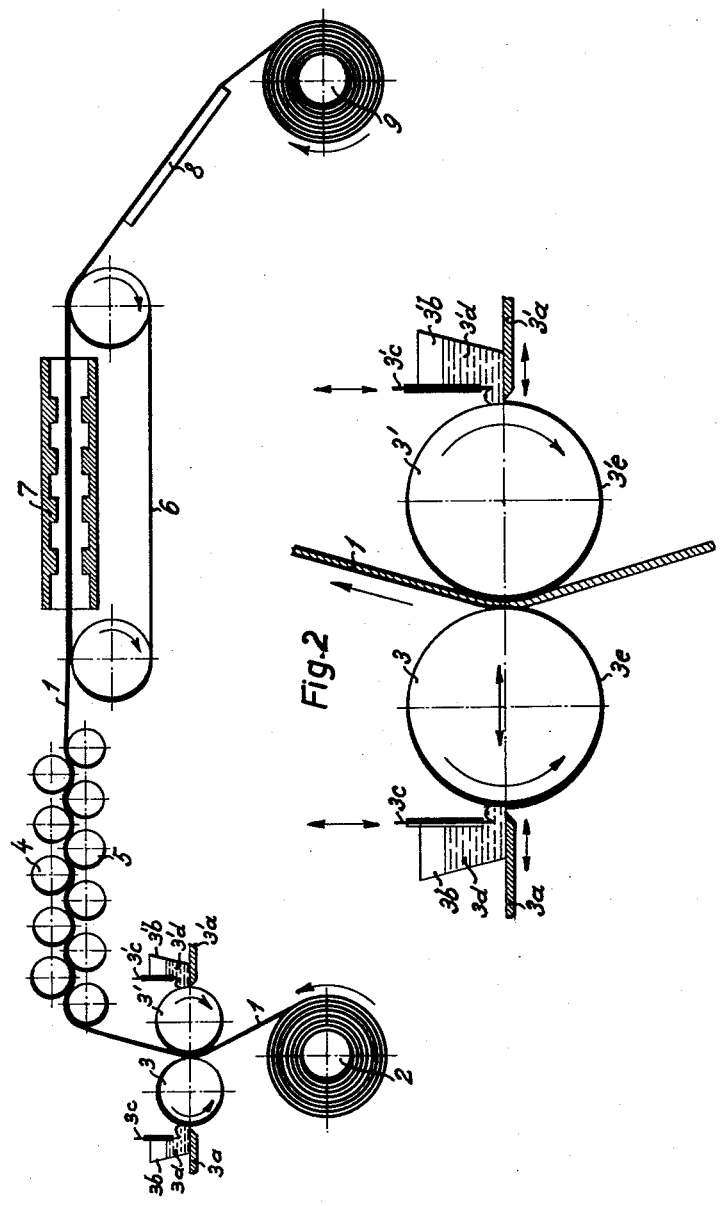

3,061,460
NON-THERMOPLASTIC FOAM MATERIAL IMPREGNATED WITH THERMOPLASTIC RESIN AND METHOD OF MAKING

Erich Schickedanz, Illereichen, near Altenstadt (Iller), Germany, assignor to The Scholl Mfg. Co., Inc., Chicago, Ill., a corporation of New York
Filed Apr. 24, 1959, Ser. No. 808,757
Claims priority, application Germany May 3, 1958
9 Claims. (Cl. 117—98)

The present invention relates to a process for the production of thermoplastic foam materials by treating a non-thermoplastic foam material with a thermoplastic plastic.

Thermoplastic foam materials made of polyvinyl chloride are already known which have open or closed cells. Since it is necessary to work at high pressures when manufacturing these foam materials, the production of the polyvinyl chloride foam materials not only involves danger, but it is also necessary to have expensive high-pressure presses and steel moulds or costly and complicated mixing machines in which gas is mixed while cooled to low temperature with the polyvinyl chloride paste to be processed. As a result, however, considerable installation costs are involved, which make the production of the foam materials expensive. Another disadvantage of the production of polyvinyl chloride foam materials consists in that each foam material can in every case only be produced with a predetermined cell structure, i.e. each cell structure presupposes a particular manufacturing process. As a result, it is either not possible or only possible with difficulty to vary the cells of the thermoplastic foam materials within one and the same manufacturing process.

In addition to thermoplastic polyvinyl chloride foam materials, synthetic foam materials with a polyurethane base are also known, which polyurethane foams are lighter and less expensive than the thermoplastic synthetic foam materials, can be more easily produced and can readily be made with pores of greatly different sizes as may be required. These synthetic foam materials are however not thermoplastic and consequently cannot or can only with difficulty be shaped or welded to other materials or to themselves. An additional disadvantage of the synthetic foam materials with a base of polyurethanes, more especially when they are used for upholstery purposes, consists in that they have a comparatively high initial hardness under load, which leads to a very hard and rigid springing action, more especially with mattresses.

The disadvantages of the aforementioned foam materials can be avoided, while simultaneously maintaining their good properties, by adopting the process of this invention which provides a process for the production of thermoplastic foam materials characterized in that a non-thermoplastic foam material is treated with a thermoplastic plastic which is self-gelling or can be gelled by heating and the thermoplastic plastic is caused to gel. The non-thermoplastic foam material may comprise polyurethane, urea-formaldehyde or latex; the thermoplastic plastic may be polyvinyl chloride. The treatment may comprise saturating, spraying or impregnating the non-thermoplastic foam material with the thermoplastic plastic. According to one form of this invention, the pores of the non-thermoplastic foam material can be broken up mechanically, for example by calendering, prior to the treatment with the thermoplastic plastic, or the cells walls of the pores can be dissolved out chemically, for example by treatment with alkali plasticizers or solvents, so that in the latter case only the cell structure is left. The non-thermoplastic foam material is preferably treated with a thermoplastic plastic converted into a dispersion. If a hard foam material is to be produced, a more or less plasticizer-free dispersion of a thermoplastic plastic is used for the treatment of the non-thermoplastic foam material, so that therefore the hardness of the final product can be regulated by the quantity of plasticizer concurrently employed.

In order to combine the good properties of a non-thermoplastic foam material, such as for example the foam materials based on polyurethane, urea-formaldehyde condensates or foamed rubber, with those of a thermoplastic plastic such as polyvinyl chloride, it is proposed according to a preferred form of this invention to saturate or impregnate said foam material with polyvinyl chloride by dipping, pressing or spraying. The polyvinyl chloride is preferably converted beforehand into a dispersion or paste. A mixture of polyvinyl chloride and a gelable plasticizer, such as for example dioctyl phthalate or dibutyl phthalate or like ester plasticizer, has proved to be advantageous. It is essential that this polyvinyl chloride-plasticizer mixture should be correctly incorporated into the non-thermoplastic foam material, and this can for example be obtained by the said polyvinyl-plasticizer mixture, in a condition between a liquid dispersion and a paste, being coated onto the non-thermoplastic foam material and then being subjected with the coating to a repeated rolling operation, whereby the applied mixture is forced into the foam material. The polyvinyl chloride-plasticizer mixture can also be applied by spraying on to the non-thermoplastic foam material. The penetration of the polyvinyl chloride-plasticizer mixture into the foam material to be treated can be accelerated by using reduced pressure. The non-thermoplastic foam material can also be impregnated in other ways with the thermoplastic plastic-plasticizer mixture. For example, the thermoplastic plastic-plasticizer mixture can be centrifuged through the non-thermoplastic foam material, the latter being impregnated in this way. In each case of treating the foam material, it is important that the thermoplastic plastic-plasticizer mixture is applied in a uniform distribution to the cell structure of the foam material.

With the saturation or impregnation of the non-thermoplastic foam material, for example a material based on polyurethane, by means of the polyvinyl chloride-plasticizer mixture, combined with a rolling process or the use of vacuum, those cell walls of the foam material which are at least still partly closed are broken up mechanically so that a foam with substantially higher absorption capacity is formed. The cells of the foam material to be treated can however also be opened prior to its treatment by subjecting it to a mechanical or chemical pretreatment. For this purpose, the foam material can be passed through rollers (calendering) whereby the cells are split open, or it can be treated by dipping and impregnation with alkali media, whereby the thin cell walls of the pores are dissolved. If an alkaline plasticizer is added to the polyvinyl chloride mentioned by way of example, the chemical opening of the cell walls can also be simultaneously obtained with the treatment of the non-thermoplastic foam material with the thermoplastic material (polyvinyl chloride). In each case, the saturation or impregnation is improved and facilitated by opening the cell walls of the non-thermoplastic foam material which is to be treated. Foam materials treated in such a manner according to this invention have a high air permeability which is especially desirable for upholstery purposes and they also have a substantially improved elasticity due to the polyvinyl chloride having been incorporated into the polyurethane foam.

If the foam material is impregnated or saturated with the mixture of polyvinyl chloride and plasticizer, it may be subjected to heat treatment, whereby the polyvinyl chloride mixture is gelled in and on the said foam material. The thermal treatment is omitted if a cold-gelling thermoplastic plastic, such as for example polyacrylic acid, is used.

The foam material with a polyurethane base and treated with polyvinyl chloride according to the example of this invention will now have the properties of easy thermal deformability (i.e. the properties of a thermoplastic foam material), a more elastic structure and thus a better upholstery effect, a greater air permeability, a higher resistance to ageing, a better resistance to acid and alkali and a particularly high bonding strength. Moreover, the treated foam material, under loading, loses the strawlike noise otherwise inherent in it. Due to its better resistance to acid and alkali, it can now also be used more widely in the chemical industry.

If a polyvinyl chloride dispersion without plasticizer is used for treating such an elastic foam material with a base of polyurethanes, it is then possible without using a special manufacturing plant, to produce a polyurethane hard foam which can in particular be used for building elements, sound absorbing elements, means for insulating against cold and heat, light building slabs and as filters for the chemical industry. The impregnation of elastic foam materials having a polyurethane base with aqueous thermoplastic plastic dispersions can be effected by simple impregnation, spraying or washing, but it is to be borne in mind that when using aqueous dispersions, and contrary to when the aforementioned paste is employed, the water content must again be removed from the impregnated foam material by drying.

The thermoplastic foam materials produced according to this invention can be used for many purposes, for example also as shaped components for the motor vehicle, shoe, clothing and upholstery industries, and also for cosmetic and domestic articles.

The present invention is more fully explained by reference to one constructional example shown in the accompanying drawing, which illustrates diagrammatically and in section in FIG. 1 and FIG. 2 one embodiment of an apparatus for the production of thermoplastic foam materials from non-thermoplastic foam materials.

A sheet 1 of foam material which is to be treated by the process of this invention and which may consist of polyurethane or a polyether or any other suitable non-thermoplastic plastic, of a thickness of about 5 mm., is drawn off a roller 2, passes between applicator rollers 3, 3' and pressing rollers 4, 5 and is fed to a revolving belt 6 by which the sheet 1 of foam material is conveyed through a heating duct 7 and thereafter is fed to a cooling means 8, from which it is taken up by a winding reel 9.

In the case of handling an elastic foam material on the base of polyurethanes, such material—if desired—may at first be treated with a 20% solution of NaOH or KOH followed by washing with a 5% acetic acid solution and with water for the purpose of opening the cells of the foam material and to facilitate the following impregnation of the mentioned foam material.

The said applicator rollers 3, 3' are each fitted laterally with a reservoir 3b, 3'b, for accommodating a thermoplastic plastic base 3d, 3'd, e.g. polyvinyl chloride paste to be used for the processing, as well as a slide member 3c, 3'c for regulating the discharge of the paste 3d, 3'd and an adjustable coating blade 3a, 3'a. As the sheet 1 of foam material travels between the applicator rollers 3, 3', it is coated on both sides with the thermoplastic plastic paste 3d, 3'd in the required thickness, and this paste 3d, 3'd is in this way already partially incorporated into the said sheet 1 of foam material.

In passing through the rollers 4, 5, this thermoplastic plastic coating is mechanically forced deeper into the sheet 1 of foam material, the penetration of the paste 3d, 3'd into the said sheet 1 being promoted by the alternate loading and unloading thereof caused by the rollers 4 and 5. The sheet 1 of foam material, substantially uniformly and thoroughly impregnated in this way, then travels by means of the belt 6 into the heating duct 7, in which the paste 3d, 3'd is caused to gel, and thereafter it passes over the cooling means 8, by which the sheet 1 now converted into a thermoplastic sheet of foam material is cooled, whereupon it is wound at 9.

The heating duct is so designed that a temperature of 160–170° C. can be applied to the impregnated sheet of foam material. It has been found that the use of infrared radiation constitutes the most economical and most convenient heating for this purpose. The cooling plate 8 is provided with a water-cooling system. The speed of travel of the foam material depends on the length of the heating duct 7 and is so adjusted that the impregnated foam material sheet 1 is heated for at least 1 minute at 160° C.

In the foregoing example the used polyvinyl chloride paste was composed as follows:

| | Parts by weight |
|---|---|
| Polyvinyl chloride | 50 |
| Dibutyl phthalate or dioctyl phthalate | 50 |
| Amino-crotonic acid-ester (as stabilizer) | 1 |
| Dyestuff (for instance a metaloxide) | 1–2 |

Instead of the mentioned paste it can also be used a paste for instance of the following composition:

| | Parts of weight |
|---|---|
| Polyvinyl chloride | 40–60 |
| Dibutyl phthalate or dioctyl phthalate | 60–40 |
| Amino-crotonic acid-ester (as stabilizer) | 1–2 |
| Dyestuff | 1–2 |

Instead of using the thermoplastic material as a paste it may also be used in the form of an aqueous dispersion for instance of the following composition:

| | Parts of weight |
|---|---|
| Polyvinyl acetate | 30–60 |
| Dibutyl phthalate or dioctyl phthalate | 15–30 |
| Emulgator (for instance Emulphor O; a non-ionogenic fat alcohol derivative) | 1–5 |
| Water to make 100. | |

Another usable dispersion, especially for the production of hard foam materials with the property to be weldable with themselves or to other materials may be composed as follows:

| | Parts of weight |
|---|---|
| Polyvinyl acetate | 50 |
| Dibutyl phthalate | 0–5 |
| Emulgator | 2–5 |
| Water to make 100. | |

Another usable dispersion consists of

| | Parts of weight |
|---|---|
| Polyvinyl acetate | 40–60 |
| Dibutyl phthalate | 0–20 |
| Emulgator | 0–5 |
| Sodium salt of an alkylsulfonic acid | 1–2 |
| Water to make 100. | |

This dispersion especially is suitable for the treatment by dipping and drying of foam materials made of rubber latex or urea-formaldehyde condensates.

I claim:

1. A method of producing a heat sealable foam material which comprises impregnating a non-thermoplastic foam selected from the group consisting of polyurethane, urea-formaldehyde, and rubber foams with a plastisol of a thermoplastic resin selected from the group consisting of polyvinyl chloride and polyvinyl acetate, and containing sufficient amounts of a plasticizer to make the resin heat-gelable, and thereafter heating the impregnated foam to a temperature sufficient to gel the thermoplastic resin and plasticizer combination within the interstices of said foam and thereby provide an impregnated material having greater elasticity and bonding ability than the unimpregnated foam.

2. The method of claim 1 in which said plasticizer is an alkyl phthalate.

3. A method of producing a heat sealable foam material which comprises impregnating a non-thermoplastic foam selected from the group consisting of polyurethane, urea-formaldehyde, and rubber foams with a plastisol of a polyvinyl chloride resin in amounts of from 60 to 40 parts by weight and an alkyl phthalate plasticizer in amounts of from 60 to 40 parts by weight, and thereafter heating the impregnated foam to a temperature sufficient to gel the thermoplastic resin and plasticizer combination within the interstices of said foam and thereby provide an impregnated material having greater elasticity and bonding ability than the unimpregnated foam.

4. A method of producing a heat sealable foam material which comprises impregnating a non-thermoplastic foam selected from the group consisting of polyurethane, urea-formaldehyde, and rubber foams with a plastisol of a polyvinyl acetate resin in amounts of from 30 to 60 parts by weight and an alkyl phthalate plasticizer in amounts of from 15 to 30 parts by weight, and thereafter heating the impregnated foam to a temperature sufficient to gel the thermoplastic resin and plasticizer combination within the interstices of said foam and thereby provide an impregnated material having greater elasticity and bonding ability than the unimpregnated foam.

5. A method of providing a heat sealable foam material which comprises breaking up cell walls of a polyurethane foam to make the foam more receptive to impregnation, impregnating the foam with a plastisol of thermoplastic resin selected from the group consisting of polyvinyl chloride and polyvinyl acetate, and containing sufficient amounts of a plasticizer to make the resin heat-gelable, and thereafter heating the impregnated foam to a temperature sufficient to gel the thermoplastic resin and plasticizer combination within the interstices of said foam and thereby provide an impregnated material having greater elasticity and bonding ability than the unimpregnated foam.

6. A foam material having improved elasticity and bonding ability comprising a cellular non-thermoplastic foam selected from the group consisting of polyurethane, urea-formaldehyde, and rubber foams, impregnated with a gelled plastisol of thermoplastic resin selected from the group consisting of polyvinyl chloride and polyvinyl acetate in combination with a sufficient amount of a plasticizer to make the resin heat-gelable.

7. The material of claim 6, in which said resin is polyvinyl chloride.

8. The material of claim 6, in which said resin is polyvinyl acetate.

9. The material of claim 6, in which said resin is polyvinyl chloride and said plasticizer is an alkyl phthalate.

References Cited in the file of this patent

UNITED STATES PATENTS

| | | |
|---|---|---|
| 2,123,155 | Groff | July 5, 1938 |
| 2,312,296 | Hempel | Feb. 23, 1943 |
| 2,772,194 | Fisher et al. | Nov. 27, 1956 |
| 2,836,509 | Berry | May 27, 1958 |
| 2,908,602 | Collardeau et al. | Oct. 13, 1959 |
| 2,933,461 | Mullen | Apr. 19, 1960 |
| 2,955,056 | Knox | Oct. 4, 1960 |
| 2,963,388 | Landouar | Dec. 13, 1960 |
| 2,964,424 | Mast | Dec. 13, 1960 |